US011062859B1

(12) United States Patent
Jordan et al.

(10) Patent No.: US 11,062,859 B1
(45) Date of Patent: Jul. 13, 2021

(54) FOOT SWITCH-INCLUDING ADAPTOR ASSEMBLY FOR BATTERY-POWERED HAND TOOL

(71) Applicants: David S. Jordan, Knoxville, TN (US); Michael C. Jordan, Knoxville, TN (US)

(72) Inventors: David S. Jordan, Knoxville, TN (US); Michael C. Jordan, Knoxville, TN (US)

(73) Assignee: iTool Equipment Holding LLC, Clinton, TN (US)

( * ) Notice: Subject to any disclaimer, the term of this patent is extended or adjusted under 35 U.S.C. 154(b) by 189 days.

(21) Appl. No.: 16/602,025

(22) Filed: Jul. 22, 2019

(51) Int. Cl.
| H01H 21/26 | (2006.01) |
| B25F 5/02 | (2006.01) |
| H01M 10/42 | (2006.01) |

(52) U.S. Cl.
CPC ............. *H01H 21/26* (2013.01); *B25F 5/02* (2013.01); *H01M 10/425* (2013.01); *H01M 2220/30* (2013.01)

(58) Field of Classification Search
CPC ........ H01H 21/26; B25F 5/02; H01M 10/425; H01M 2220/30
See application file for complete search history.

(56) References Cited

U.S. PATENT DOCUMENTS

| 3,598,947 | A | * | 8/1971 | Osborn | ................... | B63H 20/12 |
| | | | | | | 200/86.5 |
| 3,702,940 | A | * | 11/1972 | Stewart | ................ | A61C 1/0007 |
| | | | | | | 307/326 |
| 5,083,069 | A | * | 1/1992 | Jimenez | .................. | D05B 69/18 |
| | | | | | | 318/558 |
| 6,017,354 | A | * | 1/2000 | Culp | ................ | A61B 17/32002 |
| | | | | | | 606/170 |
| 9,443,678 | B1 | * | 9/2016 | Chambers | .............. | H01H 21/26 |
| 9,636,167 | B2 | * | 5/2017 | Gregg | .................... | A61B 17/00 |
| 10,537,472 | B2 | * | 1/2020 | Brennan | ................ | A61B 50/20 |
| 2004/0092992 | A1 | * | 5/2004 | Adams | ............. | A61B 17/32002 |
| | | | | | | 606/180 |
| 2006/0032667 | A1 | * | 2/2006 | Sato | .................... | H01M 50/213 |
| | | | | | | 174/260 |

(Continued)

FOREIGN PATENT DOCUMENTS

EP 0253478 A1 * 1/1988 ......... A61F 9/00736

*Primary Examiner* — Jared Fureman
*Assistant Examiner* — Michael J Warmflash
(74) *Attorney, Agent, or Firm* — Michael E. McKee (57) ABSTRACT

An adaptor assembly for use with a battery-operated hand tool which includes a battery pack-accepting portion to which a battery pack can be connected utilizes an adaptor having a body which is positionable between the battery pack-accepting portion of the hand tool and the battery pack so that electrical current which is intended to flow between the battery pack and the hand tool during tool operation passes through the adaptor. A foot-operable ON/OFF switch is connected to the adaptor so that operation of the foot-operable switch selectively permits or shuts off the flow of electrical current between the battery pack and the hand tool so that when the adaptor is positioned between the battery pack-accepting portion of the hand tool and the battery pack, the ON/OFF operation of the hand tool can be controlled by way of the foot-operable ON/OFF switch.

15 Claims, 4 Drawing Sheets

(56) References Cited

U.S. PATENT DOCUMENTS

| | | | | |
|---|---|---|---|---|
| 2009/0200283 A1* | 8/2009 | Bland | ............... | B23K 9/1087 |
| | | | | 219/132 |
| 2011/0011708 A1* | 1/2011 | Ellafrits | ............... | A61B 6/0487 |
| | | | | 200/86.5 |
| 2011/0021905 A1* | 1/2011 | Patrick | ............... | A61M 5/1452 |
| | | | | 600/424 |
| 2011/0288575 A1* | 11/2011 | Colton | ............... | A61M 37/0076 |
| | | | | 606/185 |
| 2012/0116381 A1* | 5/2012 | Houser | ............... | A61B 17/2812 |
| | | | | 606/33 |
| 2015/0182230 A1* | 7/2015 | Belagali | ............... | A61B 17/1628 |
| | | | | 606/82 |
| 2015/0206675 A1* | 7/2015 | Modi | ............... | H01H 21/26 |
| | | | | 307/119 |
| 2015/0215993 A1* | 7/2015 | Groves | ............... | F26B 3/283 |
| | | | | 219/678 |
| 2016/0287265 A1* | 10/2016 | Macdonald | ............... | H02P 6/22 |
| 2017/0000496 A1* | 1/2017 | Hershberger | ............... | B25F 5/02 |
| 2017/0196419 A1* | 7/2017 | Brown | ............... | H02J 7/0045 |

* cited by examiner

TO FOOT SWITCH ASSEMBLY 66

FOOT SWITCH-INCLUDING ADAPTOR ASSEMBLY FOR BATTERY-POWERED HAND TOOL

BACKGROUND OF THE INVENTION

This invention relates generally to battery-powered hand tools and relates, more particularly, to the means and methods by which such a hand tool is switched ON and OFF.

The class of tools with which this invention is concerned includes electrically-powered hand tools having a body within which an electrical motor is housed, and the body has a portion to which a battery pack, or module, is capable of being attached for the purpose of supplying electrical power to the motor of the tool or from which the battery pack is capable of being detached. Such a tool commonly includes a hand grip within which a trigger-style ON/OFF switch is incorporated and which is strategically located relative to the remainder of the tool body so that as the hand grip is being grasped by a hand of the user for use of the tool, the ON/OFF switch can be manipulated with the index finger of the grasping hand.

While such a hand tool can be switched ON and OFF by way of the trigger-style switch, there exists situations during which it would be desirable for the user to be able to control the operation of the tool by means other than by the trigger-style switch. For example, in a situation in which the user would prefer not to have to switch the tool ON or OFF with his grasping hand during periods of use involving difficult manipulation of the tool, it may be preferable to provide the user with an alternative means for switching the tool ON or OFF.

Therefore, it would be desirable to provide such a battery-powered hand tool with means enabling the user of the tool to switch the tool ON or OFF without requiring that the tool be switched ON or OFF by way of its trigger-style switch.

Accordingly, it is an object of the present invention to provide an adaptor assembly for use with a battery-powered hand tool of the aforedescribed class which enables the user to switch the tool ON or OFF without having to manipulate a trigger-style ON/OFF switch associated with the tool.

Another object of the present invention is to provide such an adaptor assembly which enables the tool to be switched ON or OFF by the foot of the user.

Still another object of the present invention is to provide such an adaptor assembly which includes an adaptor capable of being interposed between the body of the tool and the battery pack, or module, which is connectable to the tool for the purpose of supplying electrical power to the motor of the tool.

Yet another object of the present invention is to provide such an adaptor assembly which is uncomplicated in structure, yet effective in operation.

SUMMARY OF THE INVENTION

This invention resides in an adaptor assembly for use with both a battery-operated hand tool and a first battery pack wherein the hand tool includes a battery pack-accepting portion to which a battery pack can be connected for purposes of powering the hand tool by way of the battery pack and wherein the first battery pack is capable of powering the hand tool.

The adaptor assembly includes an adaptor having a body having two portions wherein a first of the two portions of the body is operatively connectable to the battery pack-accepting portion of the hand tool and the second of the two portions is operatively connectable to the first battery pack so that electrical current which is intended to flow between the first battery pack and the hand tool during tool operation passes through the adaptor. In addition, a foot-operable ON/OFF switch is connected to the adaptor so that operation of the foot-operable switch selectively permits or shuts off the flow of electrical current between the first battery pack and the hand tool so that when the adaptor body is connected between the battery pack-accepting portion of the hand tool and the first battery pack, the ON/OFF operation of the hand tool can be controlled by way of the foot-operable ON/OFF switch.

DETAILED DESCRIPTION OF AN ILLUSTRATIVE EMBODIMENT

Figure 1:
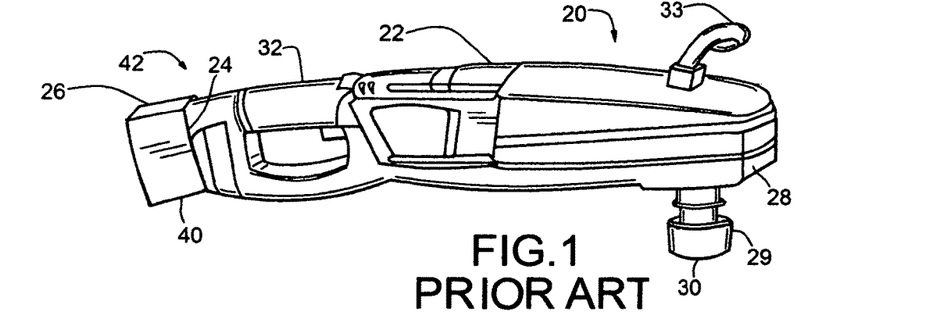
FIG. 1 is a perspective view of a portable battery-operated hand tool to which a battery pack has been attached.
Figure 2:
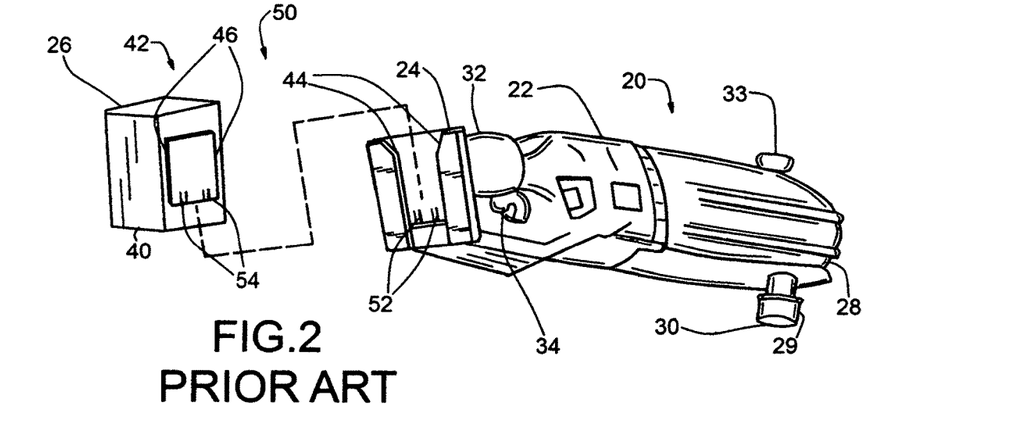
FIG. 2 is a perspective view of the hand tool of FIG. 1, as seen from an alternative angle and from which the battery pack of FIG. 1 has been detached.
Figure 3:
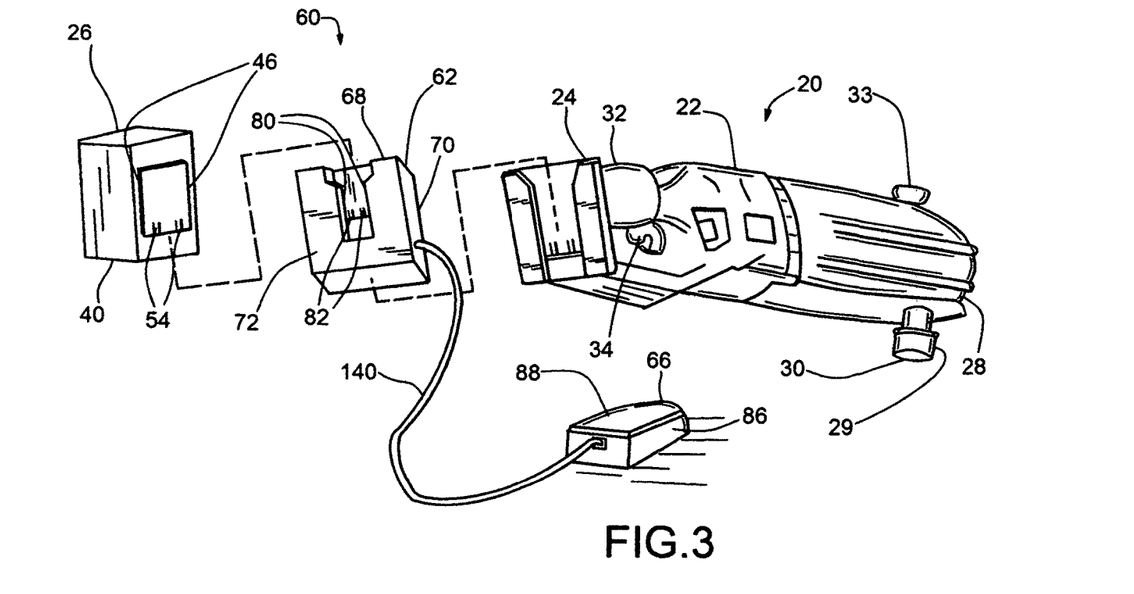
FIG. 3 is a perspective view, similar to that of FIG. 2, of the FIG. 1 hand tool and battery pack and an adaptor assembly within which features of the present invention have been incorporated.

Turning now to the drawings in greater detail and considering first FIGS. 1 and 2, there is illustrated an embodiment, generally indicated 20, of a cordless, battery-powered hand tool of the class with which an embodiment, generally indicated 60 in FIG. 3, of an adaptor assembly embodying features of the present invention is capable of being utilized and an attending battery pack 26. When connected between the tool 20 and battery pack 26, the adaptor assembly 60 enables the tool 20 to be switched ON and OFF with the foot of the user.

Briefly and with reference again to FIGS. 1 and 2, the tool 20 includes an elongated body 22 having an end portion 24 to which the battery pack 26 is connectable and an opposite, or working, end portion 28 from which a working instrument 30, such as for example, a drill bit-accepting chuck 29, extends. In addition, the tool 20 includes an electrically-powered motor 46 (FIG. 7) which is housed within the tool body 22 and which is drivingly connected to the instrument 30. Also associated with the body 22 is a first hand grip 32 with which the tool 20 can be held by a hand of the user, and a depressible trigger-style ON/OFF switch 34 is incorporated within the grip 32 for manipulation thereof with one of the fingers (commonly, the index finger) of the hand being used to grip the hand grip 32. More specifically, by depressing the switch 34 (or squeezing the switch 34 against the first hand grip 32) so that the switch 34 moves to a made condition, electrical current is permitted to pass through the contacts of the switch 34 and by subsequently releasing the switch 34 from its depressed condition so that the switch 34 moves to a break condition, no electrical current is permitted to pass through the contacts of the switch 34. An additional, or second, hand grip 33 is mounted atop the tool body 22 and is capable of being grasped by the other of the two hands of the user when carried or used by the user.

For purposes of supplying electrical power to the hand tool 20, the battery pack 26 includes a body 40 which is adapted to interfit with the end portion 24 of the hand tool 20 when the battery pack 26 is placed in operative, or working, relationship with the tool 20. In this connection, the tool end portion 24 and the body 40 of the battery pack 26 include cooperating means, generally indicated 42, by which the battery pack 26 is manipulated into operative relationship with the tool 20 by first positioning the battery pack 26 adjacent the tool end portion 24 and then sliding the battery pack 26 into a condition at which the battery pack 26 is releasably secured to the body 22 of the tool 20 and the electrical connections (described herein) between the battery pack 38 and the tool end portion 24 mate with one another.

Within the depicted hand tool 20, the cooperating means 42 includes a pair of guide tracks, or channels 44, (best shown in FIG. 2) which are associated with so as to extend along opposite sides of the tool end portion 24, and the body 40 of the battery pack 26 includes a pair of guide track followers 46 which are disposed on opposite sides of the battery pack body 40 so that by positioning one end of the guide track followers 46 in an aligned relationship with an appropriate end of the guide channels 44 and then sliding the body 40 of the battery pack 26 along the tool end portion 24 so that the guide track followers 46 are guided relative to and along the length of the guide channels 44, the body 40 of the hand tool 20, the battery pack 26 is moved into operative relationship with the tool 20.

Meanwhile, the tool end portion 24 of the tool body 22 includes a plurality of electrical connections, generally indicated 50, through which electrical power is conducted between the battery pack 26 and the tool 20 for operation of the tool 20. Within the depicted tool 20, the tool end portion 24 includes a set of (i.e. at least two) blade-type terminals 52, which are electrically connected to the internal motor of the power tool 20, and the electrical connections of the battery pack 26 includes a set of (at least two) include blade-accepting terminals 54 which are electrically connected to the power-producing cells 48 (FIG. 7) mounted internally of the battery pack 26. The terminals 54 of the battery pack 26 are adapted to operatively engage (i.e. or mate with) the blade-type terminals 52 of the tool end portion 24 when the battery pack 26 is operatively positioned in place across the tool end portion 24. In other words and upon positioning of the battery pack 26 in its operative position against the tool end portion 24, the battery pack 26 is in position to supply electrical power, when desired, to the tool 20 for operation thereof.

Within the depicted (and assembled) FIG. 1 tool 20 and battery pack 26, the ON/OFF operation of the tool 20 is normally controlled by way of the trigger-style switch 34. In other words, as the tool 20 is held by a user as one of the user's hands is gripped about the second hand grip 33 and the other of the user's hands is grasped about the first hand grip 32, the trigger-style switch 34 can be manipulated (i.e. depressed or released) with a finger (e.g. the index finger of the hand grasped about the hand grip 32) for switching the tool 20 ON and OFF. However and as will be apparent herein, it is envisioned that when using the adaptor assembly 60 to switch the tool 20 ON and OFF, the tripper-style switch 34 is maintained in a depressed condition (e.g. by being tied down with a zip-tie secured about the switch 34 and hand grip 32) so that the switch 34 is always in a made condition and thus not permitted to switch to an OFF position.

An example of a tool suitable for use as the tool 20 is available from Milwaukee Electric Tool of Brookfield, Wis. under the trade designation M18 Fuel 18-Volt Right Angle Drill with Quik-Lok.

With reference to FIG. 3, the adaptor assembly 60 includes an adaptor 62 which is positionable between the tool end portion 24 and the battery pack 26 and also includes a foot-operable ON/OFF switch assembly, generally indicated 66 in FIG. 3, which is electrically connected to the adaptor body 62 and which either enables or prevents the flow of electrical current between the battery pack 26 and the tool 20 upon appropriate manipulation of the foot-operable switch assembly 66.

Figure 4:
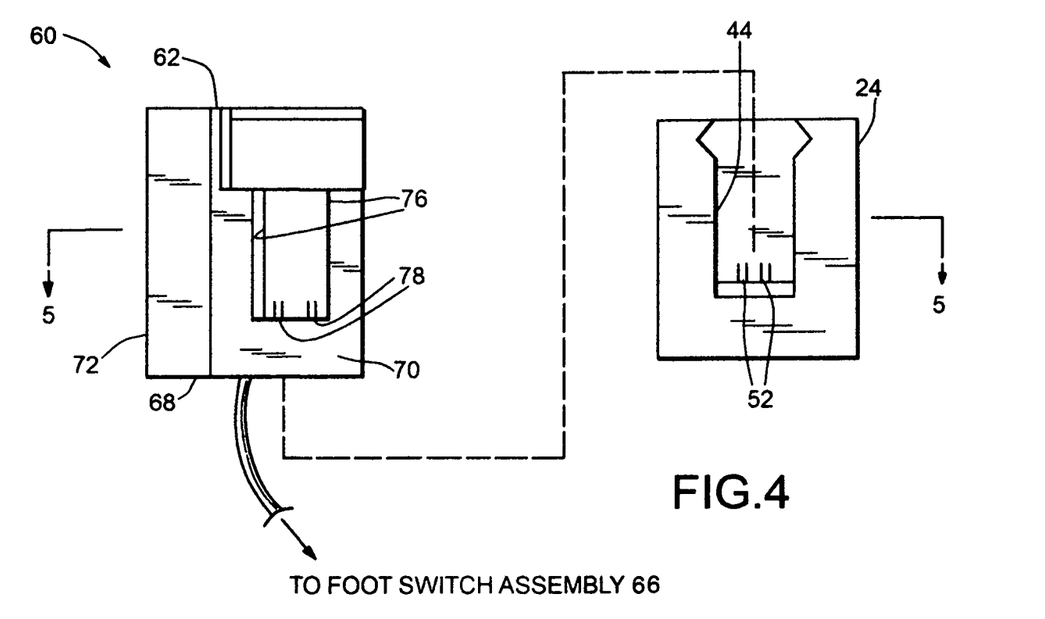
FIG. 4 is a perspective view of the adaptor component of the FIG. 3 adaptor assembly and a fragment of the FIG. 1 hand tool to which the adaptor component can be attached.
Figure 5:
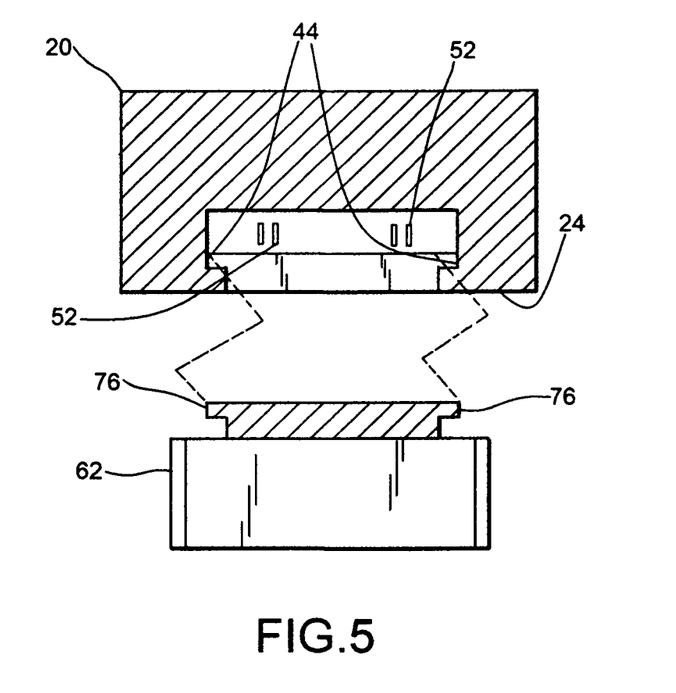
FIG. 5 is a cross-sectional view of the adaptor component and hand tool fragment taken about on line 5-5 of FIG. 4.

With reference to FIGS. 3 and 4, the adaptor 62 includes an elongated and substantially rectangular, or book-shaped body 68 having two opposite ends 70, 72, one end 70 of which is a tool-engaging end which is adapted to engage to the battery pack-accepting portion of the tool 20 and the other end 72 of which is adapted to engage the battery pack 26. That is to say that the end 70 of the adaptor 62 is configured to be positioned in operative relationship with the battery pack-accepting end portion 24 of the tool 20, and the other end 72 of the adaptor 62 is configured to be positioned in operative relationship with the battery pack 26.

In connection with the foregoing, the end 70 of the adaptor body 68 includes a pair of guide track followers 76 which extend therealong for cooperating with the guide tracks 44 of the tool end portion 24 and a plurality of electrical connections, including blade-accepting terminals 78, for engaging the blade-type terminals 52 of the tool end portion 24. To connect the adaptor 62 to the tool end portion 24, the adaptor body 68 is positioned adjacent the tool end portions 24 so that the guide track followers 76 are arranged in an aligned relationship, or registry, with the guide tracks 44, and then the adaptor body 68 is slidably moved relative to the tool portion end 24 as the guide track followers 76 are slidably moved relative to and along the length of the guide tracks 44. The relative movement between the adaptor 62 and the tool end portion 24 is thereafter halted when the blade-accepting terminals 78 are positioned about, and thus in engagement with, the blade-type terminals 52.

Meanwhile, the end 72 of the body 68 of the adaptor 62 is provided with guide tracks 80 and electrical connections, including sets of blade-type terminals 82, which are comparable in shape and size to the guide tracks 44 and terminals 52, respectively, of the tool end portion 24 for operatively accepting the battery pack 26 in the identical manner in which the battery pack 26 is operatively accepted by the tool end portion 24 when the battery pack 26 is connected directly to the tool end portion 24. Furthermore, the terminals 82 are appropriately positioned relative to the remainder of the adaptor body 68 so that when the battery pack 26 is positioned in operative relationship with the adaptor body 68, the terminals 82 are engaged by, and thus mate with, the blade-accepting terminals 54 of the battery pack 26.

To connect the battery pack 26 to the adaptor 62, the battery pack 26 is positioned adjacent the adaptor body 68 so that the guide track followers 76 of the battery pack 26 are arranged in an aligned relationship, or registry, with the guide tracks 44 of the adaptor body 68, and then the battery pack 26 is slidably moved relative to the battery pack 26 as the guide track followers 76 are slidably moved relative to and along the length of the guide tracks 44. The relative movement between the battery pack 26 and the adaptor body 68 is thereafter halted when the blade-accepting terminals 78 of the battery pack 26 are positioned about, and thus in engagement with, the blade-type terminals 82 of the adaptor body 68.

It follows that the adaptor body 68 is connected to the tool end portion 24 in a manner which is identical to the manner in which the battery pack 26 is normally connected to the tool end portion 24, and the battery pack 26 is connected to the adaptor body 68 in a manner which is identical to the manner in which the battery pack 24 is normally connected to the tool end portion 24.

When the adaptor body 68 of the adaptor assembly 60 is connected between the battery pack-accepting end portion 24 of the tool 20 and the battery pack 26 as aforedescribed, these connected components 24, 68 and 26 are held in a secured relationship with one another by the mated condition between the terminals 52, 82 and terminals 52, 78. That is to say that upon acceptance by each blade-type terminals 82, 52 (of the adaptor body 68 and the end portion 24 of the tool body 22) by the blade-accepting terminals 54, 78 (of the battery pack 26 and the adaptor body 68), the components 24, 68 and 26 are held together by the frictional-gripping engagement between the surfaces of the engaging terminals 54, 24 and 78, 68.

Figure 6:
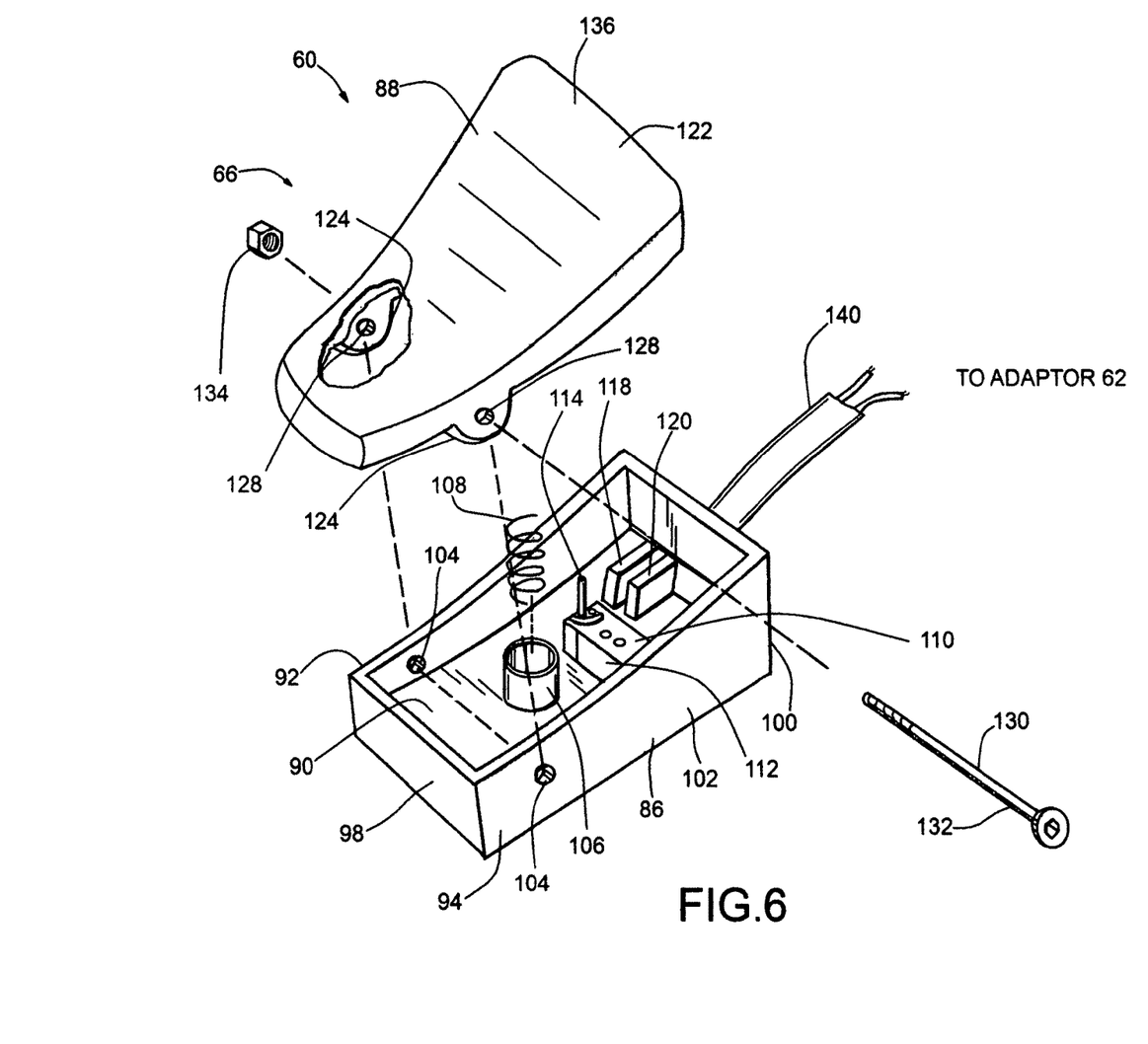
FIG. 6 is a perspective view of the foot switch assembly of the FIG. 3 adaptor assembly, shown exploded and partially cut-away.

With reference to FIGS. 3 and 6, the foot-operable ON/OFF switch assembly 66 includes a base 88 within which a plurality of switching components, described herein, are mounted and a foot pedal 88 which is pivotally attached to the base 86 for pivotal movement with respect to the base 86 between two positions (i.e. a depressed condition and an extended position). The base 86 of the depicted switch assembly 66 has a bottom 90, two sidewalls 92, 94 and two opposite end walls 98, 100 which are joined so as to form a box-like housing 102 which opens upwardly. The sidewalls 92, 94 define two aligned through-openings 104 adjacent the end wall 98 thereof, and a sleeve-like member 106 is joined to the bottom 90 so as to open upwardly therefrom. A compression spring 108 is positioned within the sleeve-like member 106 so that one of its ends (i.e. its upper end as viewed in FIG. 6) extends above the (horizontal) level of the member 106.

Mounted within the base 86 is an ON/OFF switch 110 having a body 112 which is secured (as with screws) in a stationary condition with respect to the bottom 90 and includes a vertically-extending actuator 114 which is mounted within the body 112 of the switch 110 for movement relative to the body 112 between a raised, or elevated, condition and a depressed condition. Associated with the switch 110 are a pair of terminals 118, 120 through which electrical power can be conducted when the internal contacts of the switch 110 are made. More specifically, by depressing and releasing the actuator 114, the internal contacts of the switch 110 are made so that electrical current is permitted to flow across the terminals 118, 120. Conversely, by subsequently depressing and releasing the actuator 114, the internal contacts of the switch 110 are broken so that no electrical current is permitted to flow across the terminals 118, 120.

Meanwhile, the foot pedal 88 includes a platen portion 122 and a pair of bosses 124 which are joined to so as to extend downwardly from the platen portion 122 from opposite sides thereof. Each boss 124 includes a traversely-extending opening 128 therethrough which is aligned with the through-opening 128 provided in the other boss 124. To secure the foot pedal 88 to the base 86, the foot pedal 88 is placed in overlying relationship with the base 86 so that the openings 128 provided in the bosses 124 are arranged in an aligned relationship with the through-openings 104 provided in the sidewalls 92, 94, and the shank 130 of a bolt 132 is directed endwise through the aligned through-openings 104, 128 to pin the foot pedal 88 to the base 86. Once the bolt 132 is positioned through the through-openings 104, 128 as aforedescribed, a nut 134 is secured upon the end of the bolt shank 130 opposite the head end thereof to secure the bolt 132 through the through-openings 104, 128 and to thus secure the foot pedal 88 atop the base 86.

Once secured atop the base 86, the foot pedal 88 is acted upon by the spring 108 so that one end, indicated 136, of the foot pedal 88 is continually biased about the bolt 132 from a lowered condition toward a raised condition with respect to the base 86. Stated another way, the opposite (i.e. lower and upper) ends of the compression spring 108 act, respectively, against the bottom 90 of the base 86 and the underside of the foot pedal 88 so that the end 136 of the foot pedal 88 is continually urged to an upper, or raised, condition with respect to the base 86. In addition, the underside of the foot pedal 86 is adapted to engage and thus act downwardly against the vertically-extending actuator 114 of the ON/OFF switch 110 when the end 136 of the foot pedal 88 is pressed downwardly (e.g. by the foot of the user) from the aforedescribed raised condition toward the aforedescribed lowered condition. In other words, by pivoting, or depressing, the end 134 of the foot pedal 88 downwardly about the bolt 132, the vertically-extending actuator 114 of the switch 110 is depressed so that the ON/OFF condition of the switch 110 is switched to the other of its two ON and OFF conditions. It follows that upon the release of the foot pedal 88 (e.g. by removal of the user's foot therefrom), the end 134 of the foot pedal 88 is permitted to pivot, or return, upwardly relative to the base 86 by way of the spring 108.

With reference to FIG. 3, the adaptor assembly 60 also includes conducting wires 140 which extend between the adaptor body 88 and the terminals 118, 120 associated with the ON/OFF switch 110 so that a switching operation effected by the foot pedal 88 effects the making or breaking of the switch 110. That is to say that if the switch 80 is in a made condition at which electrical current is conducted between the terminals 118, 120, the subsequent depression and release of the foot pedal switches the switch 110 to a broken condition at which no electrical current is permitted to flow between the terminals 118, 120. By comparison, if the switch 110 is in a broken condition, the subsequent depression and release of the foot pedal 88 switches the switch 110 to a made condition.

An example of a foot switch which is suitable for use as the aforedescribed foot-operable ON/OFF switch assembly 66 is referred to in the art as a power maintained foot switch and is currently available as Item 96619 from Harbor Freight Tools of Calabasas, Calif.

Figure 7:
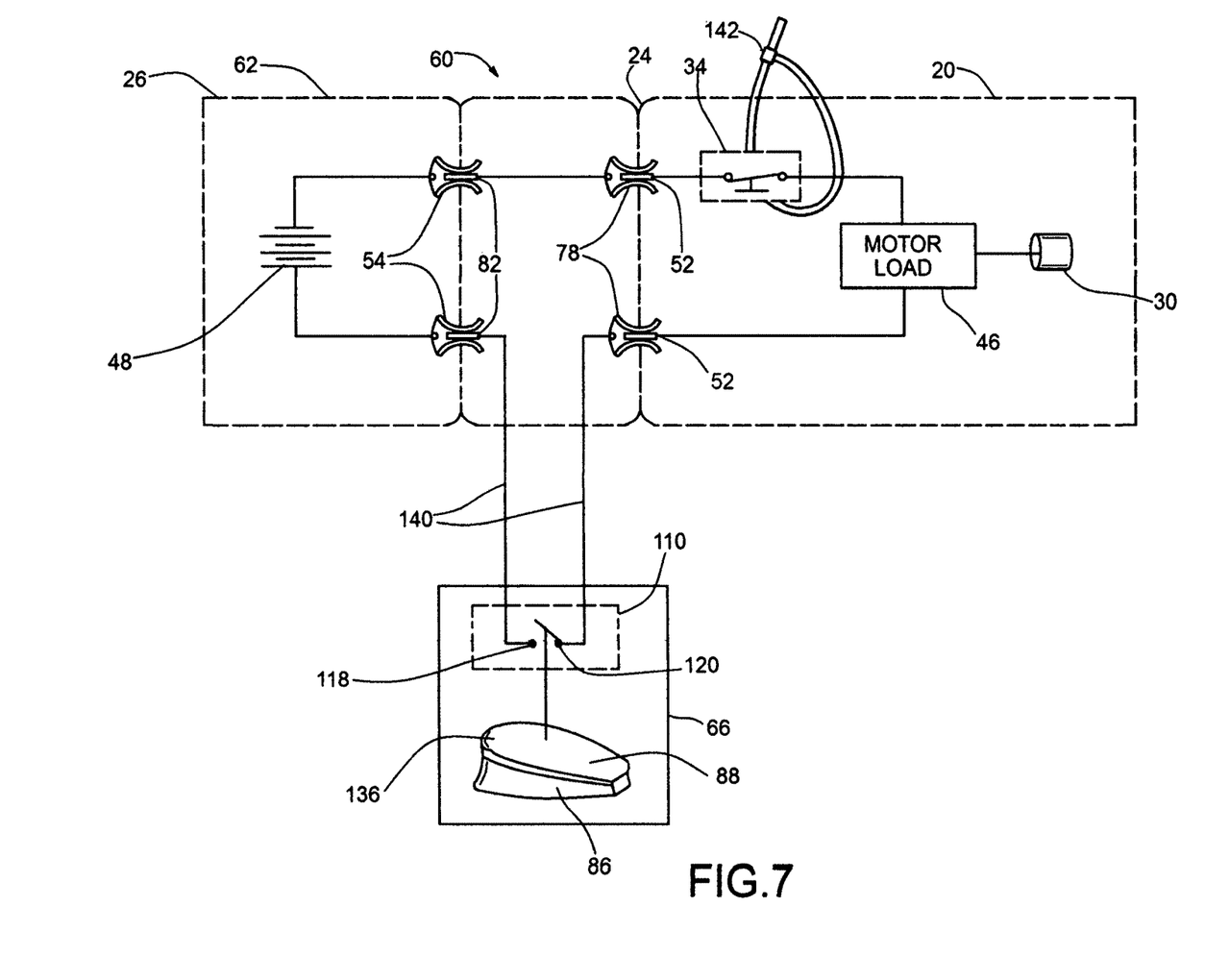
FIG. 7 is a wiring diagram illustrating schematically the electrical connections between the tool, battery pack and adaptor assembly of FIG. 3.

The operation of the adaptor assembly 20 can be best understood with reference to the wiring diagram of FIG. 7 which illustrates schematically the disposition of the adaptor body 68 when positioned between the tool 20 and the battery pack 26 for use of the adaptor assembly 60 with the tool 20. Within this FIG. 7 diagram, the trigger-style ON/OFF switch 34 associated with the tool 20 has been secured in a depressed (and preferred) condition by means of a zip tie 142 (FIG. 7) secured about both the hand grip 32 and switch 34 so that the switch 34 is continually in a made condition. By securing the trigger-style ON/OFF switch 34 in such a (i.e. made) condition, the trigger-style ON/OFF switch 34 need not be operated by the user during the use of the tool 20 and permits electrical current to pass through the contacts of the trigger-style switch 34. Meanwhile, the switch 110 associated with the foot switch assembly 66 is wired in-line with a terminal 52 of the tool end portion 24 and a terminal 78 of the battery pack 26 so that passage of electrical current between the terminals 52, 78 is selectively permitted or prevented by the operation of the switch 110 of the foot-operable switch assembly 66. Therefore and during use of the hand tool 20, a user is able to switch the tool 20 ON and OFF as the user manipulates the switch 110 of the switch assembly 66 with his foot, instead of with the one of his hands which is grasped about the first hand grip 32.

It therefore follows that an adaptor assembly 60 has been described enabling a battery-powered, hand tool 20 to be operated with the foot of a user wherein the hand tool 20 includes a portion 24 adapted to operatively accept a battery pack 26 positioned in cooperating relationship therewith for purposes of providing electrical power to the hand tool 20. The adaptor assembly 60 includes an adaptor body 22 having two opposite ends 70, 72 wherein one (i.e. the end 70) of the two opposite ends 70, 72 of the adaptor body 22 is positionable within the battery pack-accepting end portion 24 of the hand tool 20, and wherein the second (i.e. the end 72) of the two opposite ends 70, 72 of the adaptor body 22 is adapted to accept the battery pack 26 positioned in operative relationship therewith. In addition, the adaptor assembly 60 includes a foot-operable ON/OFF switch assembly 66 which is electrically connected to the adaptor body 68 and includes an actuator 114 which is movable between one (i.e. its ON) condition at which electrical current from the battery pack 26 is permitted to be conducted to the hand tool 20 for tool operation and a second (i.e. its OFF) condition at which electrical current from the battery pack 60 is prevented from being conducted to the hand tool 20.

It will be understood that numerous modifications and substitutions can be had to the aforedescribed embodiment 60 without departing from the spirit of the invention. For example, although the aforedescribed embodiment 60 has been shown and described as including a foot switch assembly 66 whose switch 110 can be switched between ON and OFF conditions by simply depressing and releasing the actuator 114 thereof, other classes of switches can be utilized as the foot switch assembly. For example, such an alternative foot switch assembly capable of use within the depicted adaptor assembly 60 is referred to in the art as a momentary power foot switch which is currently available as Item 96618 from Harbor Freight Tools of Calabasas, Calif. Whereas the power maintained foot switch described above is switched between a made condition and a break condition as the foot pedal 88 is depressed and subsequently released, a momentary power foot switch requires that the foot pedal 88 be maintained in a depressed condition in order for electrical current to be permitted to pass across the contacts of the (internal) switch of the foot switch. Upon release of the foot pedal 88 of the momentary power foot switch, no electrical current is permitted to be conducted across the contacts of the (internal) switch thereof.

Furthermore and whereas the aforedescribed battery pack 26, adaptor body 68 and end portion 24 of the tool 20 have been described as being held together by the frictional-gripping engagement between the surfaces of the engaging terminals 54, 24 and 78, 68, each of the battery pack 26 and the adaptor body 68 can include a locking arrangement by which the adaptor body 68 is releasably locked to the tool end portion 24 and the battery pack 26 is releasably locked to the adaptor body 68. Such locking arrangements commonly include a release button which is moveable between a depressed and extended conditions for releasing or locking, respectively, the component in place. Such releasably locking arrangements are well known in conjunction with battery packs of the prior art so that a more detailed description of such a locking arrangement is not believed to be necessary.

Further still and although the adaptor 62 of the adaptor assembly embodiment 60 has been shown and described as including a body 40 which is positionable between an end portion 24 of a hand tool 20 and a battery back 26 which has been designed for use with (i.e. adapted to operatively interfit with) the end portion 24, an embodiment of an adaptor 62 which incorporates the broader principals of the present invention could be positioned between the end portion of a hand tool available from one manufacturer and a battery pack which is available from another manufacturer. In other words, an adaptor 62 embodying features of the present invention could possess a tool-engaging end 70 which is capable of being positioned in operative relationship which a hand tool available from, for example, the Milwaukee Electric Tool Corporation (of Brookfield, Wis.) while the other, or battery pack-engaging, end 72 of which is capable of being positioned in operative relationship with a battery pack available, for example, from DeWalt Power Tools (of Baltimore, Md.).

Similarly, an adaptor 62 embodying features of the present invention could possess a tool-engaging end 70 which is capable of being positioned in operative relationship with a hand tool available, for example, from DeWalt Power Tools while the other, or battery pack-engaging, end 72 of which is capable of being positioned in operative relationship with a battery pack available, for example, from Makita, U.S.A., Inc. (of LaMirada, Calif.). The structure of such adaptors would differ from one another, as necessary, to accommodate—at its tool-engaging end, the battery pack-accepting end portion of the hand tool with which the adaptor is desired to be connected and to accommodate—at its battery pack-accepting end, the connections of a battery pack to which the adaptor is intended to be connected.

Accordingly, the aforedescribed embodiment 60 is intended for the purpose of illustration and not as limitation.

The invention claimed is:

1. An adaptor assembly for use with a battery-operated hand tool wherein the hand tool includes a battery pack-accepting portion to which a battery pack can be connected for purposes of powering the hand tool by way of the battery pack, the adaptor assembly comprising:
    an adaptor having a body which is positionable between the battery pack-accepting portion of the hand tool and the battery pack so that electrical current which is intended to flow between the battery pack and the hand tool during tool operation passes through the adaptor; and
    a foot-operable ON/OFF switch which is connected to the adaptor so that operation of the foot-operable switch selectively permits or shuts off the flow of electrical current between the battery pack and the hand tool
    so that when the adaptor body is positioned between the battery pack-accepting portion of the hand tool and the battery pack, the ON/OFF operation of the hand tool can be controlled by way of the foot-operable ON/OFF switch; wherein the adaptor body has two ends, and one of the two ends of the adaptor body is configured to interfit with the battery pack-accepting portion of the hand tool in the same manner in which the battery pack is capable of interfitting with the battery pack-accepting portion of the hand tool; and the other of the two ends of the adaptor body is configured to interfit with the battery pack in the same manner in which the battery pack-accepting portion of the hand tool is capable of interfitting with the battery pack; and wherein the battery pack-accepting portion of the hand tool and the one end of the adaptor body includes a first set of guide tracks and the other of the battery pack-accepting portion of the hand tool and the one end of the adaptor body includes a first set of guide track followers for connecting the adaptor to the battery pack-accepting portion of the hand tool as the first set of guide tracks are slidably moved relative to and along the first set of guide tracks; and wherein one of the other end of the adaptor body and the battery pack includes a second set of guide tracks and the other of the other end of the adaptor body and the battery pack includes a second set of guide track followers for connecting the battery pack to the adaptor body as the second set of guide track followers are slidably moved relative to and along the second set of guide tracks.

2. The adaptor assembly as defined in claim 1 wherein the foot-operable ON/OFF switch is connected to the adaptor body by way of an electrical cord which is at least four feet in length.

3. The adaptor assembly as defined in claim 1 wherein the foot-operable ON/OFF switch includes an actuator which is movable between ON and OFF conditions for switching the foot-operable ON/OFF switch ON and OFF.

4. The adaptor assembly as defined in claim 3 wherein the foot-operable ON/OFF switch includes a base, and the actuator is movable relative to the base between ON and OFF conditions for switching the foot-operable ON/OFF switch ON and OFF.

5. An adaptor assembly enabling a battery-powered, hand tool to be operated with the foot of a user wherein the hand tool includes a portion adapted to operatively accept a battery pack for purposes of powering the hand tool, the adaptor assembly comprising:

an elongated adaptor having a body including two ends wherein one of the two ends of the adaptor is positionable within the battery pack-accepting portion of the hand tool, and wherein the second of the two ends of the adaptor body is adapted to operatively accept the battery pack; and a foot-operable ON/OFF switch which is electrically connected to the elongated adaptor and which includes an actuator which is switchable between one condition at which electrical power from the battery pack is permitted to be conducted to the hand tool for purposes of tool operation and a second condition at which electrical power from the battery pack is prevented from being conducted from the battery pack to the hand tool; and wherein the adaptor has a body including two ends, and one of the two ends of the adaptor body is configured to interfit with the battery pack-accepting portion of the hand tool in the same manner in which the battery pack interfits with the battery pack-accepting portion of the hand tool; and the other of the two ends of the adaptor body is configured to interfit with the battery pack in the same manner in which the battery pack interfits with the battery pack-accepting portion; and wherein the battery pack-accepting portion of the hand tool and the one end of the adaptor body includes a first set of guide tracks and the other of the battery pack-accepting portion off the hand tool and the one end of the adaptor body includes a first set of guide track followers for connecting the adaptor body to the battery pack-accepting portion of the hand tool as the first set of guide tracks are slidably moved relative to and along the first set of guide tracks; and wherein one of the other end of the adaptor body and the battery pack includes a second set of guide tracks and the other of the other end of the adaptor body and the battery pack includes a second set of guide track followers for connecting the battery pack to the adaptor body as the second set of guide track followers are slidably moved relative to and along the second set of guide tracks.

6. The adaptor assembly as defined in claim 5 wherein the foot-operable ON/OFF switch is connected to the adaptor body by way of an electrical cord which is at least four feet in length.

7. The adaptor assembly as defined in claim 5 wherein the foot-operable switch includes an actuator which is movable between ON and OFF conditions for switching the foot-operable ON/OFF switch ON and OFF.

8. The adaptor assembly as defined in claim 7 wherein the foot-operable ON/OFF switch includes a base, and the actuator is movable relative to the base between ON and OFF conditions for switching the foot-operable ON/OFF switch ON and OFF.

9. An adaptor assembly for use with a hand-operated tool capable of being operated by a battery pack wherein the hand-operated tool includes a battery pack-accepting portion, the adaptor assembly comprising:

an adaptor having a first portion which is adapted to operatively connect to the battery pack-accepting portion of the hand-powered tool and a second portion which is adapted to accept the battery pack;

a two-position, foot-operable switch which is electrically connected to the adaptor and which is manipulable between one condition at which electrical power from the battery pack is conducted to the hand-operated tool and a second condition at which electrical power from the battery pack is prevented from being conducted to the hand-operated tool; and wherein the first portion of the adaptor is configured to interfit with the battery pack-accepting portion of the hand tool in the same manner in which the battery pack interfits with the battery pack-accepting portion of the hand tool;

and the second portion of the adaptor is configured to interfit with the battery pack in the same manner in which the battery pack interfits with the battery pack-accepting portion;

and wherein one of the battery pack-accepting portion of the hand tool and the first portion of the adaptor includes a first set of guide tracks and the other of the battery pack-accepting portion of the hand tool and the first portion of the adaptor includes a first set of guide track followers for connecting the adaptor body to the battery pack-accepting portion of the hand tool as the first set of guide tracks are slidably moved relative to and along the first set of guide tracks;

and whereon one of the second portion of the adaptor and the battery pack includes a second set of guide tracks and the other of the second portion of the adaptor and the battery pack includes a second set of guide track follower for connecting the battery pack to the adaptor as the second set of guide track followers are slidably moved relative to and along the second set of guide tracks.

10. The adaptor assembly as defined in claim 9 wherein each of the hand tool and the battery pack include electrical connections which mate with one another when the battery pack is operatively connected to the hand-operated tool, and the first portion of the adaptor includes electrical connections which are adapted to mate with those of the hand tool when the adaptor is operatively connected to the battery pack-accepting portion of the hand-operated tool, and the second portion of the adaptor includes electrical connections which are adapted to mate with those of the battery pack when the battery pack is operatively connected to the second portion of the adaptor.

11. An adaptor assembly for use with both a battery-operated hand tool and a first battery pack wherein the hand tool includes a battery pack-accepting portion to which a battery pack can be connected for purposes of powering the hand tool by way of the battery pack and wherein the first battery pack is capable of powering the hand tool, the adaptor assembly comprising:

an adaptor having a body having two portions wherein a first of the two portions of the body is operatively connectable to the battery pack-accepting portion of the hand tool and the second of the two portions is operatively connectable to the first battery pack so that electrical current which is intended to flow between the first battery pack and the hand tool during tool operation passes through the adaptor; and a foot-operable ON/OFF switch which is connected to the adaptor so that operation of the foot-operable switch selectively permits or shuts off the flow of electrical current between the first battery pack and the hand tool so that when the adaptor body is connected between the battery pack-accepting portion of the hand tool and the first battery pack, the ON/OFF operation of the hand tool can be controlled by way of the foot-operable ON/OFF switch; wherein one of the battery pack-accepting portion of the hand tool and the first portion of the adaptor body includes a first set of guide tracks and the other of the battery pack-accepting portion of the hand tool and the first portion of the adaptor body includes a first set of guide track followers for connecting the adaptor to the battery pack-accepting portion of the hand tool as the first set of guide tracks are slidably moved relative to and along the first set of guide tracks;

and wherein one of the second portion of the adaptor body and the battery pack includes a second set of guide tracks and the second portion of the other end of the adaptor body and the battery pack includes a second set of guide track followers for connecting the battery pack to the adaptor body as the second set of guide track followers are slidably moved relative to and along the second set of guide tracks.

12. The adaptor assembly as defined in claim 11 wherein each of the hand tool and the battery pack include electrical connections, and the first portion of the adaptor body includes electrical connections which are adapted to mate with those of the hand tool when the adaptor is operatively connected to the battery pack-accepting portion of the hand tool, and the second portion of the adaptor body includes electrical connections which are adapted to mate with those of the battery pack when the battery pack is operatively connected to the second portion of the adaptor body.

13. The adaptor assembly as defined in claim 11 wherein the foot-operable ON/OFF switch is connected to the adaptor body by way of an electrical cord which is at least four feet in length.

14. The adaptor assembly as defined in claim 11 wherein the foot-operable ON/OFF switch includes an actuator which is movable between ON and OFF conditions for switching the foot-operable ON/OFF switch ON and OFF.

15. The adaptor assembly as defined in claim 14 wherein the foot-operable ON/OFF switch includes a base, and the actuator is movable relative to the base between ON and OFF conditions for switching the foot-operable ON/OFF switch ON and OFF.

\* \* \* \* \*